United States Patent
Chang et al.

(10) Patent No.: US 8,657,280 B2
(45) Date of Patent: Feb. 25, 2014

(54) PAPER-FEEDING DEVICE AND MULTI-FUNCTION PRINTER

(75) Inventors: Po-Chih Chang, New Taipei (TW); Chung-Liang Huang, New Taipei (TW)

(73) Assignees: Cal-Comp Electronics & Communications Company Limited, New Taipei (TW); Kinpo Electronics, Inc., New Taipei (TW)

(*) Notice: Subject to any disclaimer, the term of this patent is extended or adjusted under 35 U.S.C. 154(b) by 121 days.

(21) Appl. No.: 13/452,944

(22) Filed: Apr. 23, 2012

(65) Prior Publication Data

US 2013/0114986 A1 May 9, 2013

(30) Foreign Application Priority Data

Nov. 9, 2011 (TW) .............................. 100140885 A

(51) Int. Cl.
*B65H 3/06* (2006.01)
*B65H 3/52* (2006.01)

(52) U.S. Cl.
USPC ............................ 271/117; 271/118; 271/121

(58) Field of Classification Search
USPC ......................................... 271/117, 118, 121
See application file for complete search history.

(56) References Cited

U.S. PATENT DOCUMENTS

| | | | |
|---|---|---|---|
| 6,307,621 B1* | 10/2001 | Endo et al. ..................... 355/407 |
| 7,320,462 B2* | 1/2008 | Takamatsu ................... 271/3.14 |
| 7,506,867 B2* | 3/2009 | Lee et al. ....................... 271/117 |
| 7,837,188 B2* | 11/2010 | Lee et al. ....................... 271/117 |
| 8,047,533 B2* | 11/2011 | Kuo ............................... 271/121 |
| 8,052,139 B1* | 11/2011 | Su et al. ......................... 271/117 |
| 8,231,122 B2* | 7/2012 | Tu .................................. 271/121 |
| 8,474,813 B2* | 7/2013 | Cheng et al. ................... 271/121 |
| 8,496,240 B1* | 7/2013 | Tu et al. ......................... 271/117 |
| 2004/0253030 A1* | 12/2004 | Hamada et al. ................ 399/367 |
| 2005/0225022 A1* | 10/2005 | Akiyama et al. ........... 271/10.03 |
| 2008/0197560 A1* | 8/2008 | Lee et al. ....................... 271/121 |
| 2008/0277864 A1* | 11/2008 | Liu et al. ....................... 271/117 |
| 2010/0308528 A1* | 12/2010 | Chung et al. .................. 271/117 |

FOREIGN PATENT DOCUMENTS

| | | |
|---|---|---|
| TW | M290160 | 5/2006 |
| TW | 201024096 | 7/2010 |

* cited by examiner

*Primary Examiner* — Patrick Cicchino
(74) *Attorney, Agent, or Firm* — Jianq Chyun IP Office

(57) ABSTRACT

A paper-feeding device and a multi-function printer (MFP) using the paper-feeding device are provided. The MFP includes a housing with the paper-feeding device installed thereon. The paper-feeding device includes an outer case, an inner case and a retainer. The outer case has first side-walls, openings and slots, in which each opening and each slot on the opening are correspondingly disposed on each first side-wall. The inner case is located beside the first side-walls of the outer case and has a second side-wall. The second side-wall has a position-limiting rib protruding towards the first side-walls. The retainer is located between the first side-walls and has a body, a protrusion and a pivot, in which the protrusion is disposed at a top-portion of the body and correspondingly located in the slots, and the pivot is located between the protrusion and a retaining-portion of the body and correspondingly locked in the openings.

12 Claims, 8 Drawing Sheets

PAPER-FEEDING DEVICE AND MULTI-FUNCTION PRINTER

CROSS-REFERENCE TO RELATED APPLICATION

This application claims the priority benefit of Taiwan application serial no. 100140885, filed on Nov. 9, 2011. The entirety of the above-mentioned patent application is hereby incorporated by reference herein and made a part of this specification.

BACKGROUND OF THE INVENTION

1. Field of the Invention

The invention generally relates to a paper-feeding device and a multi-function printer (MFP), and more particularly, to a paper-feeding device and a multi-function printer with lower cost.

2. Description of Related Art

With the advent of information society, in an office, office automatic equipments such as scanner, photocopier or printer are disposed, so that users can use the office automatic equipments to conduct word processing work. It should be noted that when the above-mentioned office automatic equipments are all disposed in an office, much spaces are occupied. In this regard, an MFP integrating photocopying, printing and scanning functions was developed to solve the above-mentioned problem.

The user usually place a pile of paper sheets at the MFP to conduce photocopying, printing or scanning, such that the MFP needs a retainer to precisely retain the paper sheets during paper sheets are fed into the MFP to avoid too many paper sheets from simultaneously entering and affecting the normal printing operation or the printing quality.

FIG. 1 is a schematic diagram of a conventional MFP. Referring to FIG. 1, the paper-feeding device of the conventional MFP includes a first retainer 110, a second retainer 120 and a rib 130 disposed at an inner case for driving the first retainer 110. When the paper-feeding device is not during a paper-feeding process, the first retainer 110 contacts and retains the second retainer 120, and the second retainer 120 forbids paper from entering the MFP. During a paper-feeding process, the inner case falls down to make the rib 130 disposed on the inner case push the first retainer 110, so that the first retainer 110 rotates in clockwise direction to release the position-limiting on the second retainer 120 and the second retainer 120 can freely rotate. At the time, a paper-feeding roller rotates so that the paper sheets can freely pass through the second retainer 120 and then enter the paper sheet transportation channel.

However, after the user opens the outer case of the MFP to maintain the parts inside the MFP and closes the outer case, the first retainer 110 or the second retainer 120 may not return back to its original position, so that the first retainer 110 or the second retainer 120 is unable to normally and effectively work.

In addition, the above-mentioned design requires two retainers, which increases the material consumption and the cost.

SUMMARY OF THE INVENTION

Accordingly, the invention is directed to a paper-feeding device with a lower manufacture cost.

The invention is also directed to an MFP having good printing quality.

The invention provides a paper-feeding device, which includes an outer case, an inner case and a retainer. The outer case has a pair of first side-walls, a pair of openings and a pair of slots, in which each of the openings and each of the slots are correspondingly disposed on each of the first side-walls and each of the slots is located on a corresponding opening. The inner case is located beside the pair of first side-walls of the outer case and has a second side-wall, in which the second side-wall has a position-limiting rib and the position-limiting rib is protruding towards the first side-walls. The retainer is located between the pair of first side-walls and has a body, a protrusion and a pivot, in which the body has a top-portion and a retaining-portion, the protrusion is disposed at the top-portion and correspondingly located in the pair of slots, and the pivot is located between the protrusion and the retaining-portion and correspondingly locked in the openings. During a feeding paper process, the inner case moves relative to the outer case, the pivot of the retainer moves relative to the position-limiting rib, the retainer anticlockwise rotates around the pivot as the rotation center axis from a retaining position to a paper-feeding position, and the position-limiting rib interferes with the pivot of the retainer so as to fix the retainer at the paper-feeding position.

The invention also provides an MFP using the above-mentioned paper-feeding device. The MFP includes a housing and an above-mentioned paper-feeding device disposed on the housing.

In an embodiment of the present invention, the position-limiting rib interferes with the protrusion of the retainer so as to fix the retainer at the retaining position when the paper-feeding device is not during a feeding paper process.

In an embodiment of the present invention, the above-mentioned paper-feeding device further includes a first paper-picking element and a second paper-picking element, in which the first paper-picking element and the second paper-picking element are disposed at opposite sides of the inner case and both the first paper-picking element and the second paper-picking element go through the inner case. The above-mentioned first paper-picking element includes a first rotation shaft and a first paper-feeding roller, the first rotation shaft goes through the inner case, and the first paper-feeding roller is mounted on the first rotation shaft and located in the inner case. In addition, the second paper-picking element includes a second rotation shaft and a second paper-feeding roller, the second rotation shaft goes through the inner case, and the second paper-feeding roller is mounted on the second rotation shaft and located in the inner case. The paper-feeding device further includes a paper-bearing tray disposed under the first paper-feeding roller and located in the inner case.

Based on the description above, in the paper-feeding device of the invention, the two retainers in the prior art are integrated into one retainer in the invention. In addition, by a relative moving between the inner case and the outer case, the position-limiting rib and the retainer are able to match each other and so as to position-limit the retainer at the paper-feeding position or the retaining position. In comparison with the prior art, the paper-feeding device of the invention employs fewer components and such that a manufacture cost is effectively saved, the assembling hours and operations are reduced and the labour cost is lowered down.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
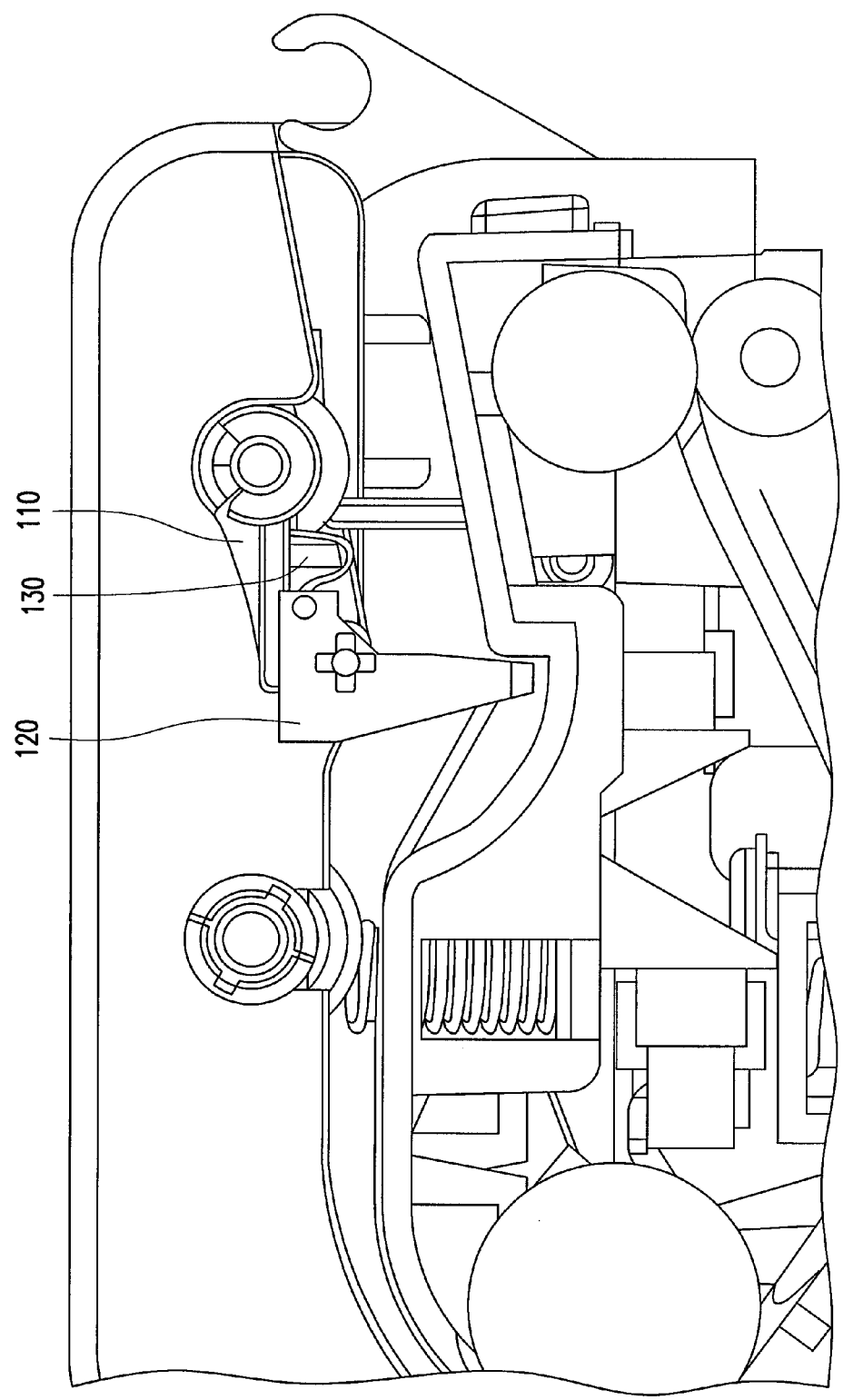
FIG. 1 is a schematic diagram of a conventional MFP.
Figure 2:
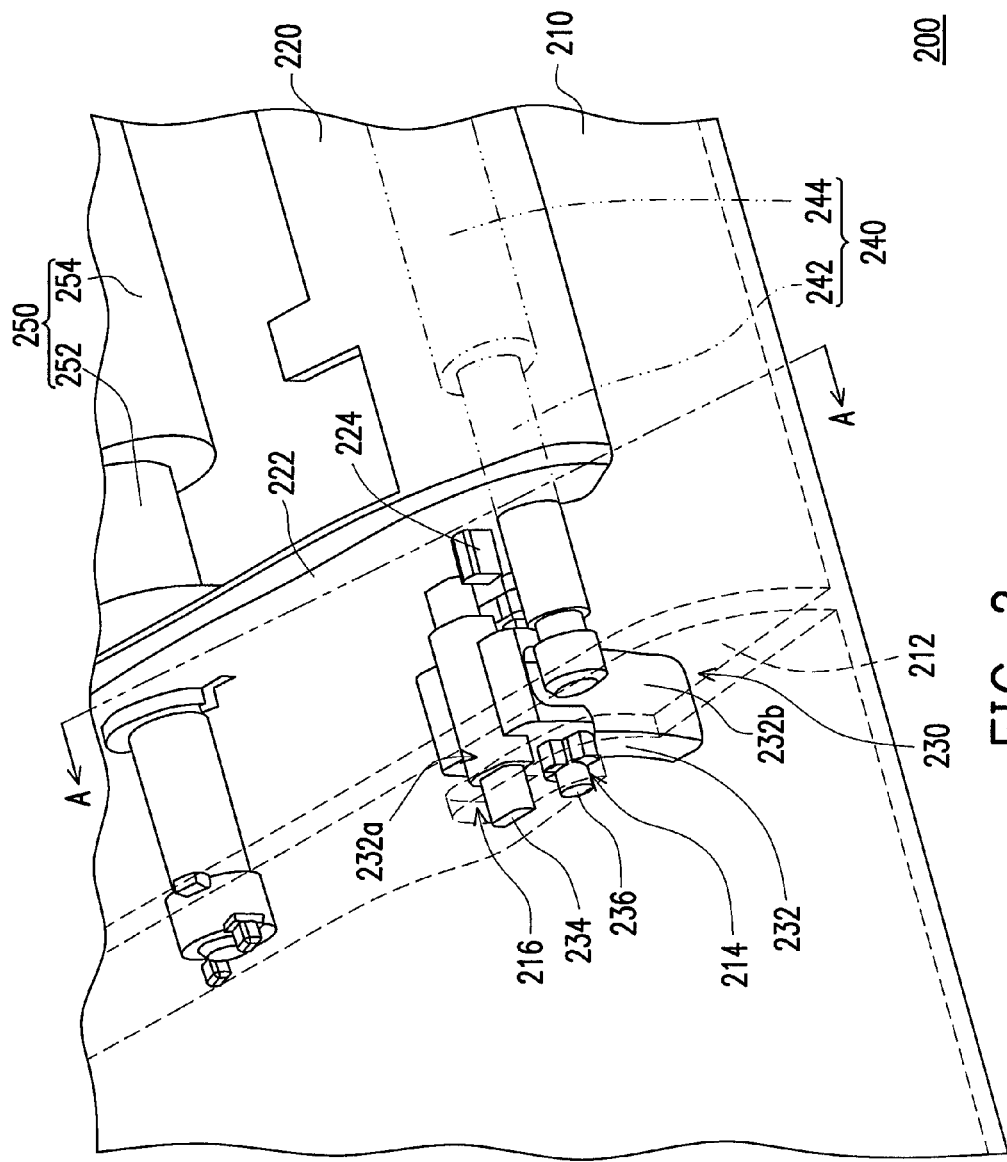
FIG. 2 is a schematic diagram of a paper-feeding device according to an embodiment of the invention.
Figure 3:
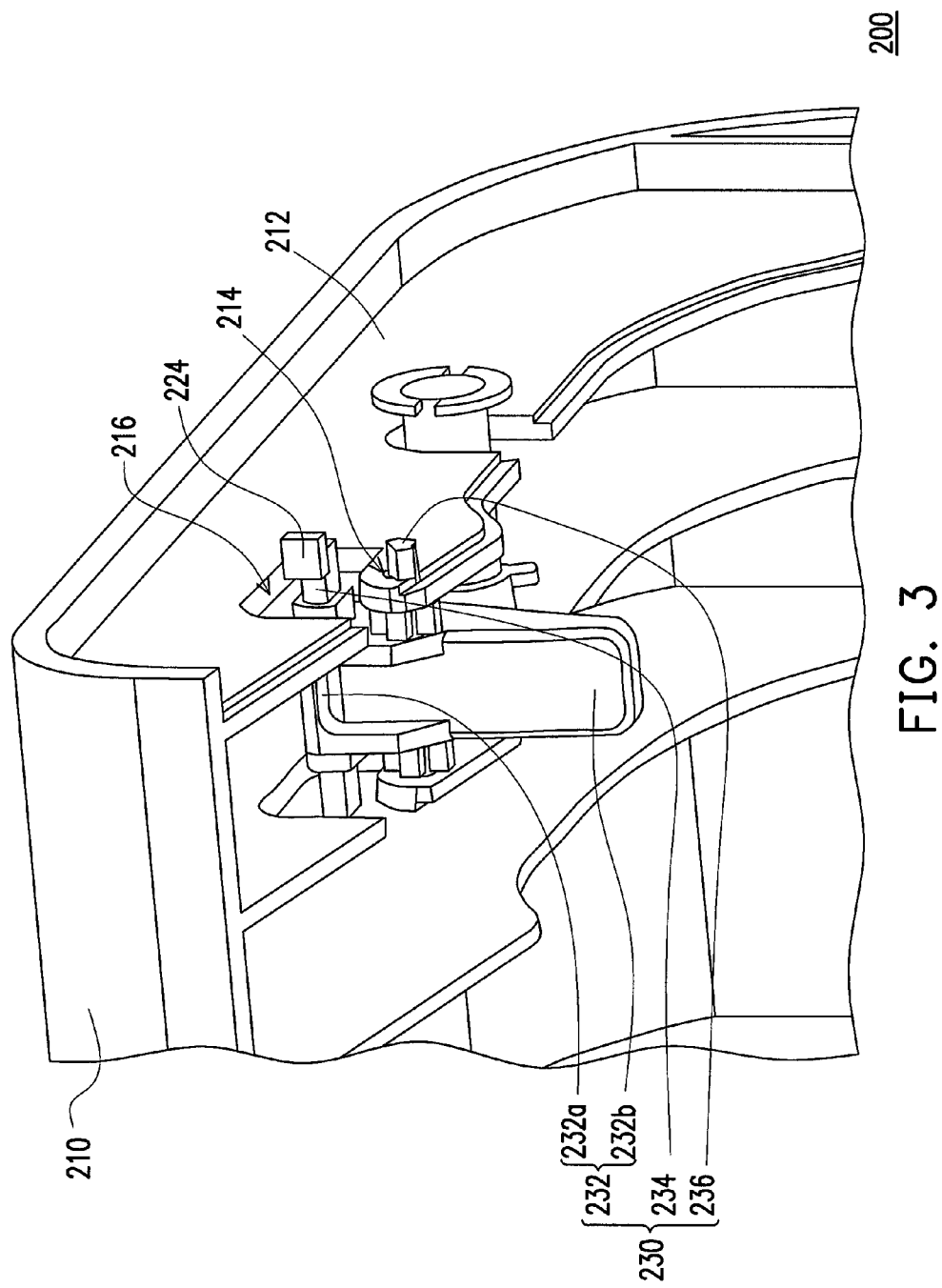
FIG. 3 is a diagram of the paper-feeding device of FIG. 2 in view along the section line A-A thereof.
Figure 4:
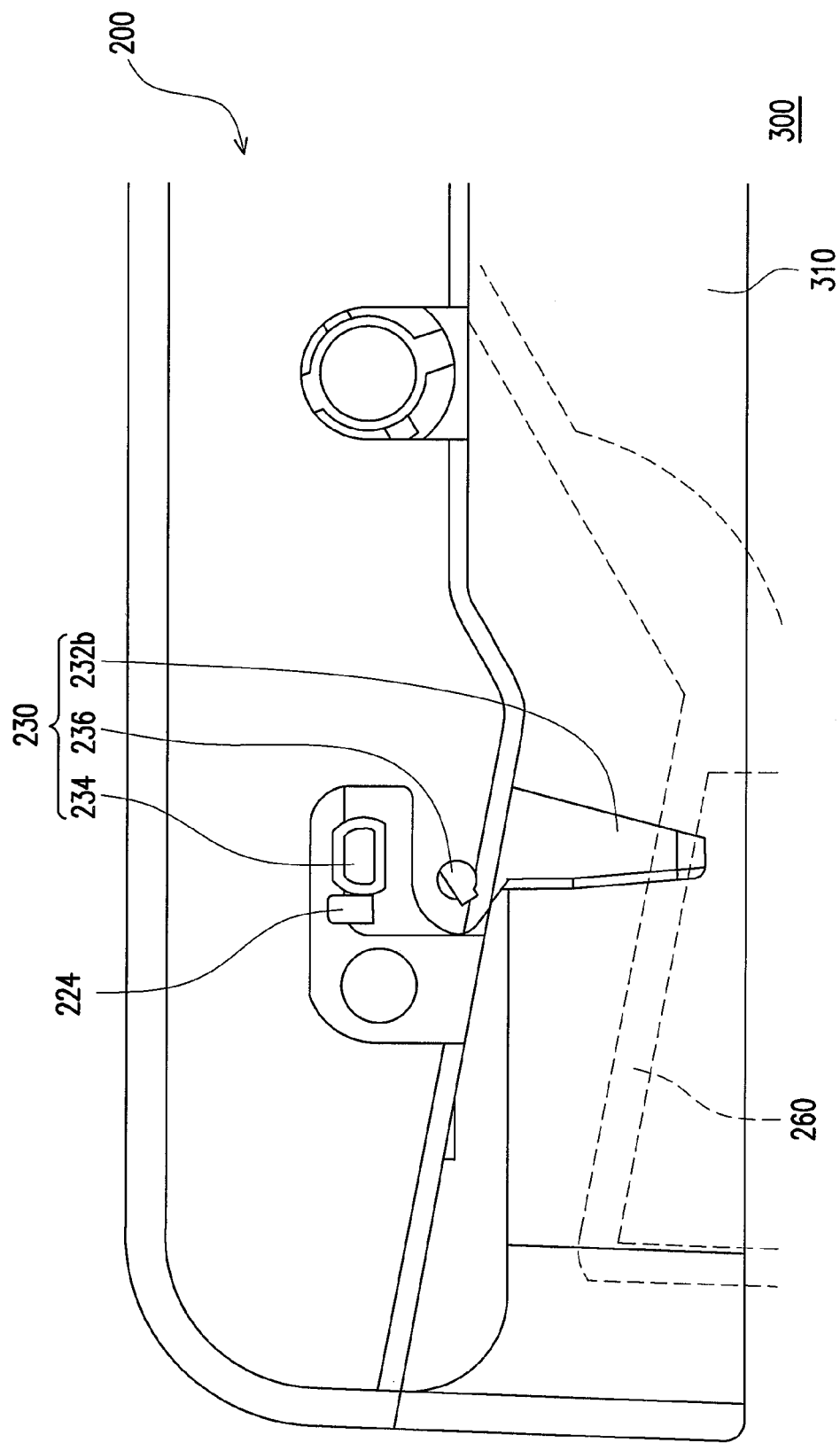
FIG. 4 is a schematic diagram of an MFP using the paper-feeding module of FIG. 2.

FIG. 2 is a schematic diagram of a paper-feeding device according to an embodiment of the invention, FIG. 3 is a diagram of the paper-feeding device of FIG. 2 in view along the section line A-A thereof and FIG. 4 is a schematic diagram of an MFP using the paper-feeding module of FIG. 2. Referring to FIGS. 2, 3 and 4, a paper-feeding device 200 includes an outer case 210, an inner case 220 and a retainer 230. For simplicity, in FIG. 2, only the relevant components of the outer case 210 are shown, while the rest portions of the outer case 210 are omitted. The outer case 210 has a pair of first side-walls 212, a pair of openings 214 and a pair of slots 216, in which each of the openings 214 and each of the slots 216 are correspondingly disposed on each of the first side-walls 212 and each of the slots 216 is located on a corresponding opening 214. The inner case 220 is located beside the first side-walls 212 of the outer case 210 and has a second side-wall 222. The second side-wall 222 has a position-limiting rib 224 protruding towards the first side-walls 212. The retainer 230 is located between the first side-walls 212 and has a body 232, a protrusion 234 and a pivot 236. The body 232 has a top-portion 232a and a retaining-portion 232b, the protrusion 234 is disposed at the top-portion 232a and correspondingly located in the slots 216. The pivot 236 is located between the protrusion 234 and the retaining-portion 232b and correspondingly locked in the openings 214.

The paper-feeding device 200 further includes a first paper-picking element 240 and a second paper-picking element 250. The first paper-picking element 240 and the second paper-picking element 250 are disposed at opposite sides of the inner case 220 and both the first paper-picking element 240 and the second paper-picking element 250 go through the inner case 220. The above-mentioned first paper-picking element 240 includes a first rotation shaft 242 and a first paper-feeding roller 244, in which the first rotation shaft 242 goes through the inner case 220 and the first paper-feeding roller 244 is mounted on the first rotation shaft 242 and located in the inner case 220. In addition, the second paper-picking element 250 includes a second rotation shaft 252 and a second paper-feeding roller 254, in which the second rotation shaft 252 goes through the inner case 220 and the second paper-feeding roller 254 is mounted on the second rotation shaft 252 and located in the inner case 220. In addition, the paper-feeding device 200 further includes a paper-bearing tray 260 (shown by FIG. 4) disposed under the first paper-feeding roller 244, and the paper-bearing tray 260 is located in the inner case 220.

By disposing the above-mentioned paper-feeding device 200 on a housing 310, an MFP 300 is formed.

Figure 5:
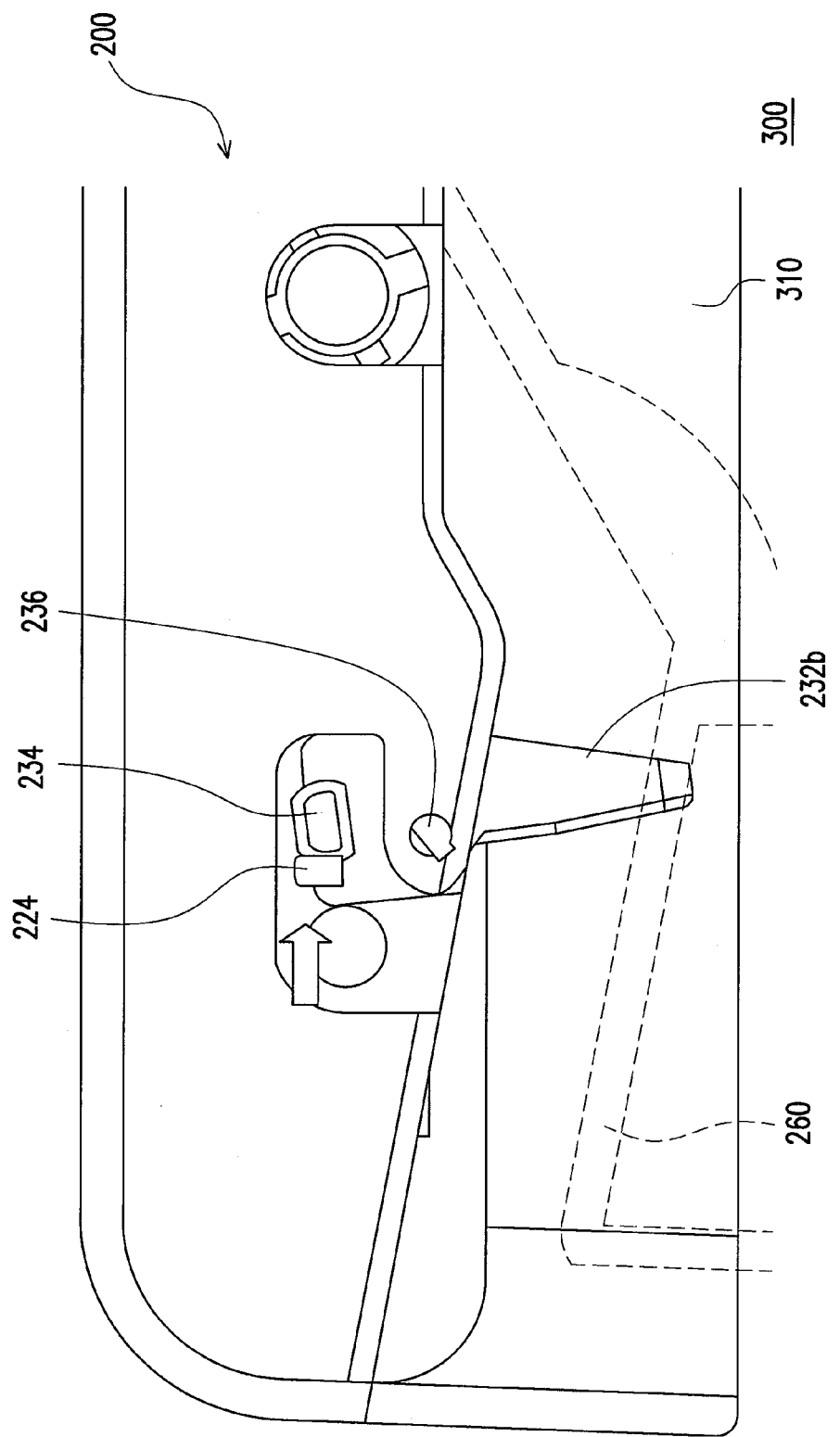
FIGS. 5-8 are schematic diagrams of an MFP showing the workflow of feeding paper.

FIGS. 5-8 are schematic diagrams of an MFP showing the workflow of feeding paper. Referring to FIGS. 2, 4 and 5, when the MFP 300 does not perform printing or photocopying procedure, the paper-feeding device 200 does not feed paper. At the time, the position-limiting rib 224 of the second side-wall 222 of the inner case 220 interferes with the protrusion 234 of the retainer 230, and so as to fix the retainer 230 at a retaining position. The paper sheets get position-limiting by the retaining-portion 232b of the body 232 of the retainer 230 and do not enter the housing 310 to perform printing or photocopying procedure.

Figure 6:
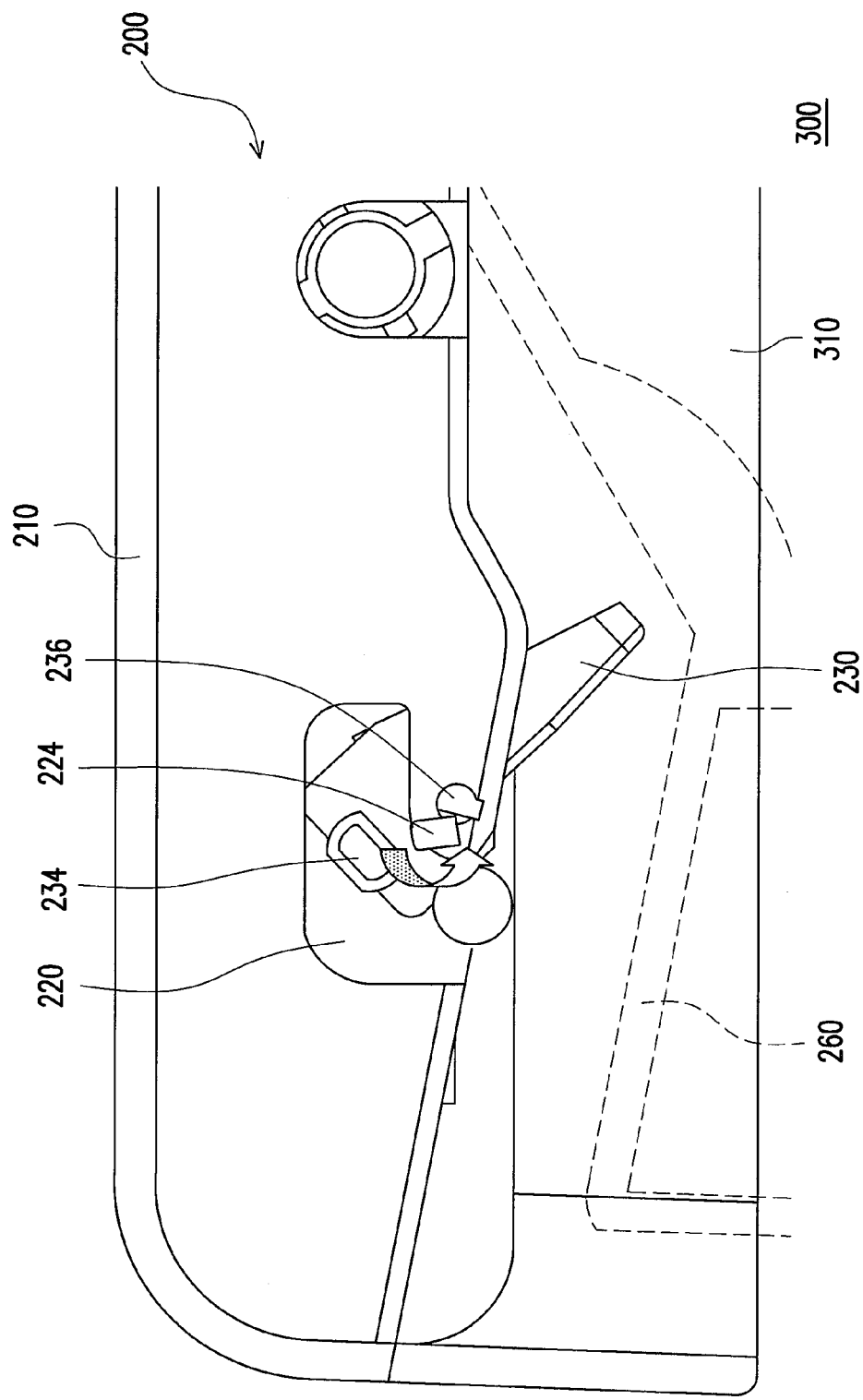

Referring to FIGS. 2 and 6, when the MFP 300 performs photocopying or printing procedure, the paper-feeding device 200 starts feeding paper. At the time, the inner case 220 would move relative to the outer case 210 realized by that one side of the inner case 220 where the first paper-picking element 240 is disposed clockwisely rotates around the second rotation shaft 252 of the second paper-picking element 250 as the rotation center axis. At the time, the side of the inner case 220 where the first paper-picking element 240 is disposed would move towards the paper-bearing tray 260 (shown in FIG. 5), and the position-limiting rib 224 along with the inner case 220 also moves relative to the retainer 230 from the position for limiting the protrusion 234 of the retainer 230 to the position for limiting the pivot 236 of the retainer 230.

Figure 7:
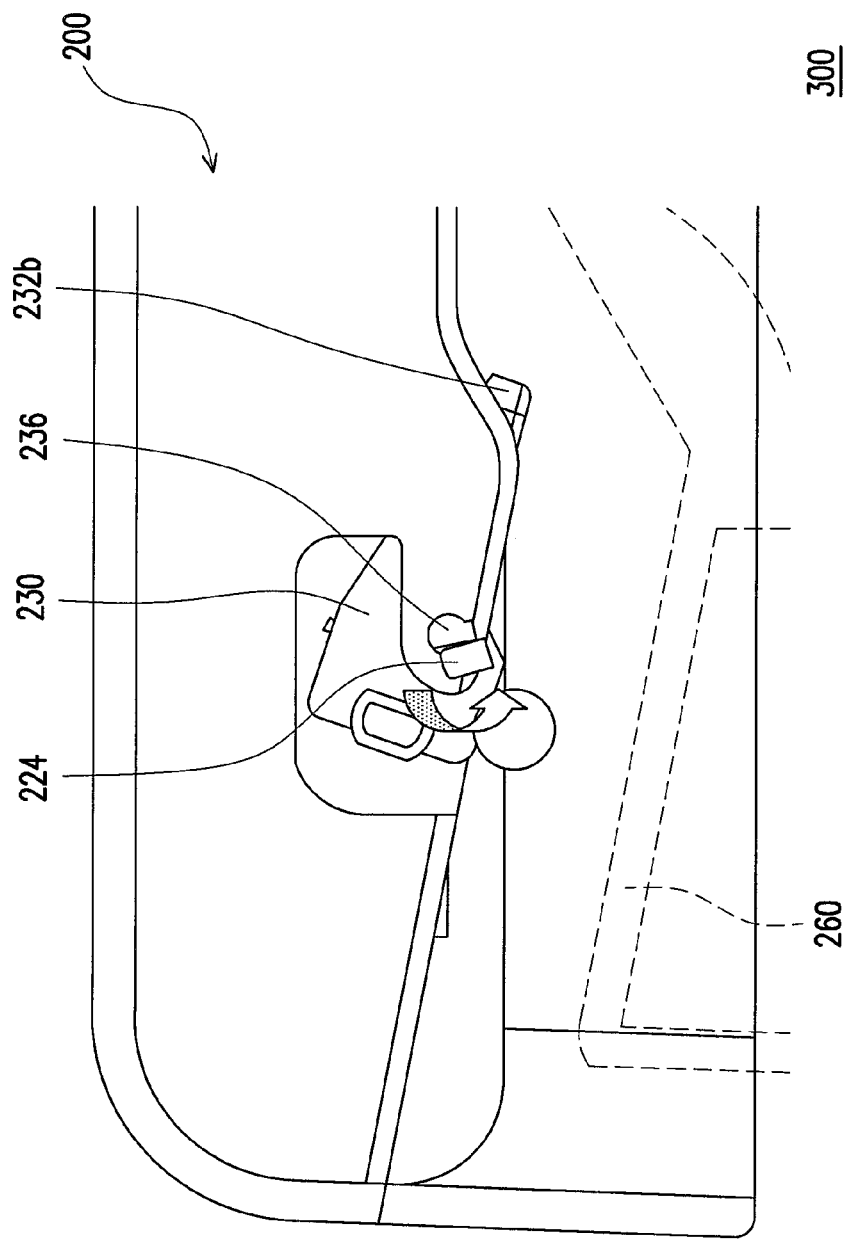

When the position-limiting rib 224 contacts the pivot 236, by using a mutual shape matching between the position-limiting rib 224 and the pivot 236, the position-limiting rib 224 pushes the pivot 236 so that the retainer 230 anticlockwise rotates around the pivot 236 as the rotation center axis from a retaining position to a paper-feeding position (as shown by FIG. 7), and then, the first rotation shaft 242 of the first paper-picking element 240 rotates so that the first paper-feeding roller 244 contacts the paper sheets to convey the paper to a paper sheet transportation path (not shown) to perform photocopying or printing procedure.

After that, referring to FIG. 7, during the continuous paper-feeding procedure, the position and the shape of the position-limiting rib 224 match the position and the shape of the pivot 236 of the retainer 230, the position-limiting rib 224 can interfere with the pivot 236 of the retainer 230, so that the position-limiting rib 224 can fix the retainer 230 at the paper-feeding position. Under the situation, the retaining-portion 232b of the body 232 of the retainer 230 is relative far away from the paper-bearing tray 260, so that the fed paper sheet is not contacted by the retainer 230, which can keep the integrity of the paper sheet during feeding the paper sheet.

Figure 8:
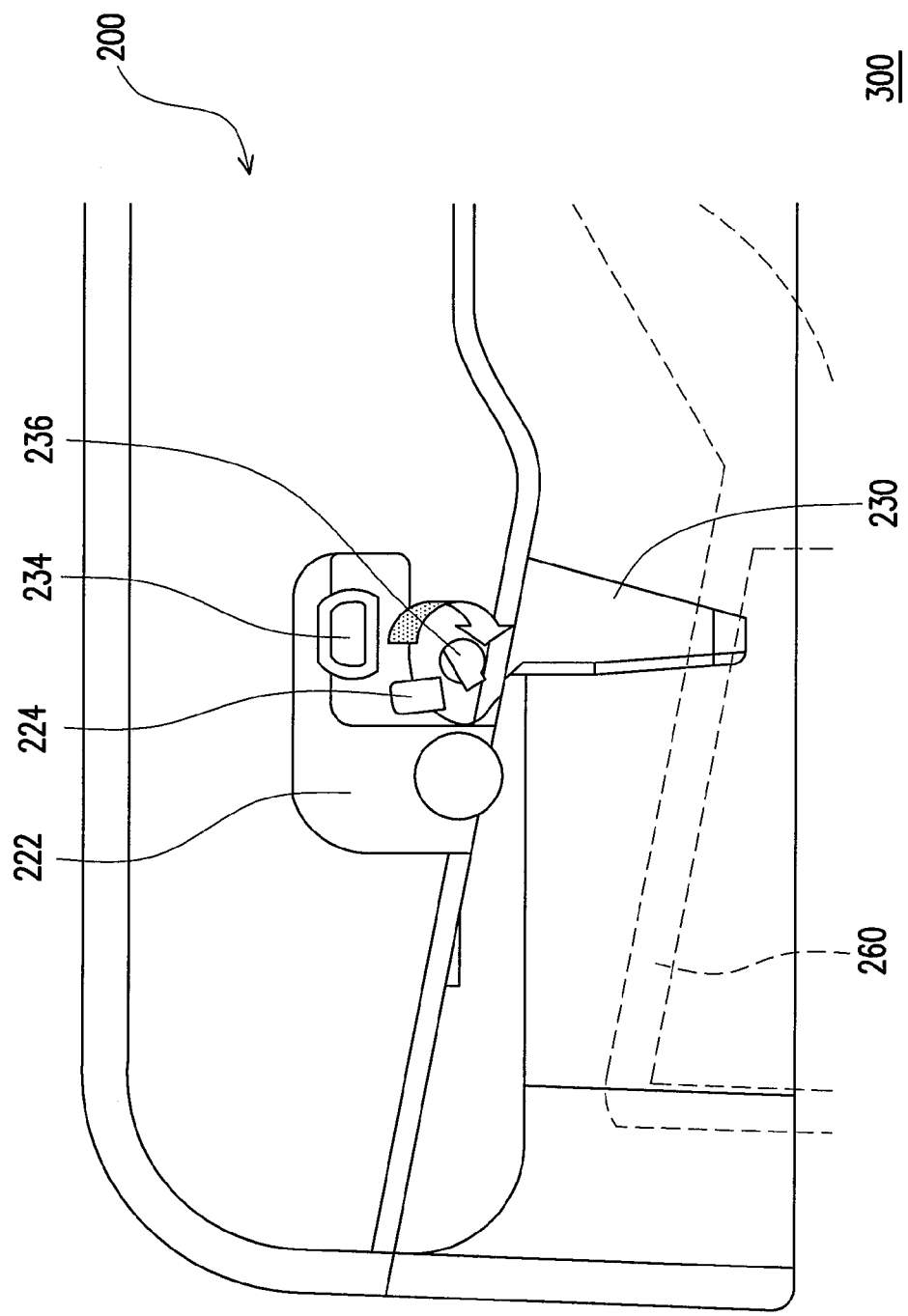

Referring to FIGS. 2, 4 and 8, when the MFP 300 ends the printing or the photocopying procedure, a side of the inner case 220 where the first paper-picking element 240 is disposed would anticlockwise rotates around the second rotation shaft 252 of the second paper-picking element 250, and the position-limiting rib 224 along with the second side-wall 222 of the inner case 220 also moves so as to release the position-limiting on the pivot 236 of the retainer 230 and the retainer 230 clockwise rotates back around the pivot 236 as the rotation center axis by means of the weight of the retainer 230 from the paper-feeding position to the retaining position until the next time the position-limiting rib 224 interferes with the protrusion 234 again. At the next time of interfering, the position-limiting rib 224 fixes the retainer 230 at the retaining position to effectively retain the paper sheets.

In summary, in comparison with the prior art, in the paper-feeding device of the invention and the MFP using the paper-feeding device, by the mutual matching between the position-limiting rib disposed on the inner case and the retainer, the retainer can be limited at the retaining position or the paper-feeding position.

In addition, the position-limiting rib can fix the retainer at the paper-feeding position, and during feeding paper, the retainer located at the paper-feeding position does not interfere with the paper sheet which can keep the integrity of the paper sheet and further advance the printing quality.

Moreover, by integrating the two retainers in the paper-feeding device of the prior art into one retainer in the invention and applying the paper-feeding device of the invention in an MFP employing the device, the invention can effectively reduce the number of the parts and save part cost and reduce the assembling operations and the labor hours.

It will be apparent to those skilled in the art that the descriptions above are several preferred embodiments of the invention only, which does not limit the implementing range of the invention. Various modifications and variations can be made by people skilled in the art to the structure of the invention without departing from the scope or spirit of the invention. The claim scope of the invention is defined by the claims hereinafter.

What is claimed is:

1. A paper-feeding device, comprising:
    an outer case, having a pair of first side-walls, a pair of openings and a pair of slots, wherein each of the openings and each of the slots are correspondingly disposed on each of the first side-walls and each of the slots is located on a corresponding opening;
    an inner case, located beside the pair of first side-walls of the outer case and having a second side-wall, wherein the second side-wall has a position-limiting rib and the position-limiting rib is protruding towards the first side-walls; and
    a retainer, located between the pair of first side-walls and having a body, a protrusion and a pivot, wherein the body has a top-portion and a retaining-portion, the protrusion is disposed at the top-portion and correspondingly located in the pair of slots, and the pivot is located between the protrusion and the retaining-portion and correspondingly locked in the openings,
    during a feeding paper process, the inner case moves relative to the outer case, the pivot of the retainer moves relative to the position-limiting rib, the retainer anticlockwise rotates around the pivot as the rotation center axis from a retaining position to a paper-feeding position, and the position-limiting rib interferes with the pivot of the retainer so as to fix the retainer at the paper-feeding position.

2. The paper-feeding device as claimed in claim 1, wherein the position-limiting rib interferes with the protrusion of the retainer so as to fix the retainer at the retaining position when the paper-feeding device is not during a feeding paper process.

3. The paper-feeding device as claimed in claim 1, further comprising a first paper-picking element and a second paper-picking element, wherein the first paper-picking element and the second paper-picking element are disposed at opposite sides of the inner case and both the first paper-picking element and the second paper-picking element go through the inner case.

4. The paper-feeding device as claimed in claim 3, wherein the first paper-picking element comprises a first rotation shaft and a first paper-feeding roller, the first rotation shaft goes through the inner case, and the first paper-feeding roller is mounted on the first rotation shaft and located in the inner case.

5. The paper-feeding device as claimed in claim 4, further comprising a paper-bearing tray disposed under the first paper-feeding roller and located in the inner case.

6. The paper-feeding device as claimed in claim 3, wherein the second paper-picking element comprises a second rotation shaft and a second paper-feeding roller, the second rotation shaft goes through the inner case, and the second paper-feeding roller is mounted on the second rotation shaft and located in the inner case.

7. A multi-function printer, comprising:
    a housing;
    a paper-feeding device, disposed on the housing and comprising:
        an outer case, mantling the housing and having a pair of first side-walls, a pair of openings and a pair of slots, wherein each of the openings and each of the slots are correspondingly disposed on each of the first side-walls and each of the slots is located on a corresponding opening;
        an inner case, located beside the pair of first side-walls of the outer case and having a second side-wall, wherein the second side-wall has a position-limiting rib and the position-limiting rib is protruding towards the first side-walls; and
        a retainer, located between the pair of first side-walls and having a body, a protrusion and a pivot, wherein the body has a top-portion and a retaining-portion, the protrusion is disposed at the top-portion and correspondingly located in the pair of slots, and the pivot is located between the protrusion and the retaining-portion and correspondingly locked in the openings,
        during a feeding paper process, the inner case moves relative to the outer case, the pivot of the retainer moves relative to the position-limiting rib, the retainer anticlockwise rotates around the pivot as the rotation center axis from a retaining position to a paper-feeding position, and the position-limiting rib interferes with the pivot of the retainer so as to fix the retainer at the paper-feeding position.

8. The multi-function printer as claimed in claim 7, wherein the position-limiting rib interferes with the protrusion of the retainer so as to fix the retainer at the retaining position when the multi-function printer is not during a feeding paper process.

9. The multi-function printer as claimed in claim 7, wherein the paper-feeding device further comprises a first paper-picking element and a second paper-picking element, the first paper-picking element and the second paper-picking element are disposed at opposite sides of the inner case and both the first paper-picking element and the second paper-picking element go through the inner case.

10. The multi-function printer as claimed in claim 9, wherein the first paper-picking element comprises a first rotation shaft and a first paper-feeding roller, the first rotation shaft goes through the inner case, and the first paper-feeding roller is mounted on the first rotation shaft and located in the inner case.

11. The multi-function printer as claimed in claim 10, wherein the paper-feeding device further comprises a paper-bearing tray disposed under the first paper-feeding roller and located in the inner case.

12. The multi-function printer as claimed in claim 9, wherein the second paper-picking element comprises a second rotation shaft and a second paper-feeding roller, the second rotation shaft goes through the inner case, and the second paper-feeding roller is mounted on the second rotation shaft and located in the inner case.

* * * * *